(12) United States Patent
Pratone

(10) Patent No.: US 9,055,605 B2
(45) Date of Patent: Jun. 9, 2015

(54) METHOD FOR ESTABLISHING A SECURE LOGICAL CONNECTION BETWEEN AN INTEGRATED CIRCUIT CARD AND A MEMORY CARD THROUGH A TERMINAL EQUIPMENT

(75) Inventor: Davide Pratone, Turin (IT)

(73) Assignee: TELECOM ITALIA S.P.A., Milan (IT)

(*) Notice: Subject to any disclaimer, the term of this patent is extended or adjusted under 35 U.S.C. 154(b) by 1489 days.

(21) Appl. No.: 11/666,553

(22) PCT Filed: Oct. 29, 2004

(86) PCT No.: PCT/EP2004/052728
§ 371 (c)(1),
(2), (4) Date: Apr. 30, 2007

(87) PCT Pub. No.: WO2006/045344
PCT Pub. Date: May 4, 2006

(65) Prior Publication Data
US 2009/0020602 A1    Jan. 22, 2009

(51) Int. Cl.
*H04M 1/66* (2006.01)
*H04W 88/02* (2009.01)

(52) U.S. Cl.
CPC ...................................... *H04W 88/02* (2013.01)

(58) Field of Classification Search
USPC .............................. 455/558, 410, 420, 550.1;
713/168–169; 725/133
See application file for complete search history.

(56) References Cited

U.S. PATENT DOCUMENTS

| 6,012,634 | A | 1/2000 | Brogan et al. | |
|---|---|---|---|---|
| 6,216,015 | B1 | 4/2001 | Hymel | |
| 6,345,988 | B1 * | 2/2002 | Ketcham | 439/74 |
| 6,669,487 | B1 * | 12/2003 | Nishizawa et al. | 439/60 |
| 6,925,560 | B1 * | 8/2005 | Basquin | 713/169 |
| 6,978,157 | B1 * | 12/2005 | Amiens | 455/558 |
| 2002/0016500 | A1 | 2/2002 | Matsumoto et al. | |
| 2002/0165008 | A1 * | 11/2002 | Sashihara et al. | 455/558 |

(Continued)

FOREIGN PATENT DOCUMENTS

| DE | 101 60 526 A1 | 6/2003 |
|---|---|---|
| EP | 1 278 154 A1 | 1/2003 |

(Continued)

OTHER PUBLICATIONS

3GPP TS 51.011 Specification, http://www.3gpp.org/ftp/specs/html-info/51011.htm, printed on Dec. 17, 2010.

(Continued)

*Primary Examiner* — Nathan Taylor
(74) *Attorney, Agent, or Firm* — Finnegan, Henderson, Farabow, Garrett & Dunner, L.L.P.

(57) ABSTRACT

A user system includes terminal equipment, a removable integrated circuit card and a removable memory card configured to cooperate with the terminal equipment, a card link application provided in the integrated circuit card to establish and manage a secure logical connection between the integrated circuit card and the memory card through the terminal equipment, and an application programming interface provided in the terminal equipment to receive and execute commands from the card link application and to cooperate with the card link application to establish the secure logical connection between the integrated circuit card and the memory card through the first terminal equipment.

15 Claims, 6 Drawing Sheets

(56) References Cited

U.S. PATENT DOCUMENTS

| | | | |
|---|---|---|---|
| 2002/0184539 A1* | 12/2002 | Fukuda et al. | 713/202 |
| 2002/0198022 A1* | 12/2002 | Huber | 455/557 |
| 2003/0093812 A1* | 5/2003 | Chang et al. | 725/133 |
| 2005/0140504 A1* | 6/2005 | Marshall et al. | 340/480 |
| 2005/0191970 A1* | 9/2005 | Hasegawa | 455/90.3 |
| 2005/0207562 A1* | 9/2005 | Nachef et al. | 379/357.01 |

FOREIGN PATENT DOCUMENTS

| | | |
|---|---|---|
| FR | 2 800 228 | 4/2001 |
| WO | WO-02/067611 A1 | 8/2002 |

OTHER PUBLICATIONS

3GPP TS 51.014 Specification, http://www.3gpp.org/ftp/specs/html-info/51014.htm, printed on Dec. 17, 2010.

* cited by examiner

METHOD FOR ESTABLISHING A SECURE LOGICAL CONNECTION BETWEEN AN INTEGRATED CIRCUIT CARD AND A MEMORY CARD THROUGH A TERMINAL EQUIPMENT

CROSS REFERENCE TO RELATED APPLICATION

This application is a national phase application based on PCT/EP2004/052728, filed Oct. 29, 2004, the content of which is incorporated herein by reference.

TECHNICAL FIELD OF THE INVENTION

The present invention relates to a method for establishing a secure logical connection between an integrated circuit card and a memory card through a terminal equipment.

BACKGROUND ART

As is known, services supported by next generation user terminal equipments, such as personal digital assistants, mobile phone, smart phones or laptops connected to wireless local area networks (WLANs), allow users to access high value-added contents in the network and also to exchange sensitive information in commercial transactions and in many other applications now accessible to mobile users.

A terminal equipment is generally provided with a removable integrated circuit card which manages security, communication features and transactions, and, optionally, with a removable memory card with a large memory size, such as a multimedia card, a secure Digital™ input/output card, a memory Stick™ card etc., which allows the user to store music, videos, games and personal data.

Presently, a terminal equipment controls the integrated circuit card and the memory card through separate physical and logical channels, and acts on these peripherals as a master in order to perform services which exploit their features separately, i.e. the terminal equipment keeps always the control of the communication and does not permit the direct communication between these peripherals.

An example of such a terminal equipment can be a mobile phone which uses a subscriber identity module (SIM) card in order to access the GSM mobile communication network, and a multimedia card to store music, videos, and games. The mobile phone exchanges data with the SIM card through a standard interface defined in the 3GPP TS 51.011 and can receive commands from the SIM card thanks to a proactive interface defined in the 3GPP TS 51.014. This standard describes the physical and the logical channels between the mobile phone and the SIM card, but does not provide any link with the multimedia card; the latter is in fact accessible only by the application which runs on the mobile phone and there isn't no way for the SIM card to reach it.

Some examples of a terminal equipment which uses a number of cards to exploit their features separately are disclosed in EP-A-1 278 154, U.S. Pat. No. 6,012,634, U.S. Pat. No. 6,216,015, US 2002/016500, and WO 02/067611.

In particular, EP-A-1 278 154 discloses a Multifunction integrated circuit card having the form factor of a multimedia card or a secure Digital™ card and including a card substrate provided with terminals arranged in two rows in a zigzag fashion, and a memory card and a SIM card mounted on the card substrate and exclusively connected to predetermined terminals. The memory card and the SIM card are separately provided with areas for storing secrete codes for security, so that the multifunction integrated circuit card is capable of implementing multifunction facilities different in security level.

U.S. Pat. No. 6,012,634 discloses a smart card which can communicate with both a smart-card-compatible device and a memory-card-compatible device. The smart card includes a processor which performs smartcard functions and a memory for use with a memory card device connection which allows operation of the memory-card-compatible device. Cellular telephones facilitate the use of two types of cards therein.

U.S. Pat. No. 6,216,015 discloses a wireless subscriber unit which includes a memory manager capable of communicating with a plurality of smart cards. The memory manager is programmed to allocate a memory segment to each smart card when it is operatively connected to an interface of the wireless subscriber unit. The memory manager communicates with the smart card to update data stored in the memory segment.

US 2002/0165008 discloses a mobile phone wherein private data stored in its internal memory are erased when the SIM card is pulled out. Before being erased, the private data are encrypted and transferred to and stored into an external memory. The encrypted private data stored into the external memory can be reused when the SIM card is used in another mobile telephone.

WO 02/067611 discloses a method for administrating a SIM card inserted in a main smart card reader of a mobile phone of the type including a second smart card reader, using an additional administrator smart card temporarily inserted in this second smart card reader. The administrator smart card includes at least one specific loader applet and one or more files corresponding to the applets which can be loaded in the SIM card under the control of the loader. The administrator card complies with the SIM toolkit standard. The method can also be used to carry out the deletion, modification and various operations on data or applets present in the SIM card: display, determination of the memory space, etc.

The fact that terminal equipments control the integrated circuit card and the memory card through separate physical and logical channel is a great bar to the development of new services based on scenarios where the service provider is the owner of both the integrated circuit card and the memory card, and the commercial success of which services mainly depends on their independence from the processing capabilities of the terminal equipments.

OBJECT AND SUMMARY OF THE INVENTION

The aim of the present invention is therefore to provide a method for establishing a secure logical connection between an integrated circuit card and a memory card through a terminal equipment.

This aim is achieved by the present invention in that it relates to a user system, as defined in claim 1, and to a method for establishing a secure logical connection between an integrated circuit card and a memory card through a terminal equipment, as defined in claim 11.

The present invention meets the aforementioned needs because the integrated circuit card acts as master in the communication with the memory card, and may open and close a logical channel with the memory card and perform commands on it. Therefore, an application which runs inside the integrated circuit card may set the communication with the memory card asking the terminal equipment for a physical connection with it, and an application programming interface on the terminal equipment interprets the integrated circuit card requests and performs the adaptation to the different physical layers. The application which runs on the integrated circuit card may also cipher or sign data in order to avoid any intrusion in or modification of the terminal equipment.

BRIEF DESCRIPTION OF THE DRAWINGS

For a better understanding of the present invention, a preferred embodiment, which is intended purely as an example and is not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

Figure 1:
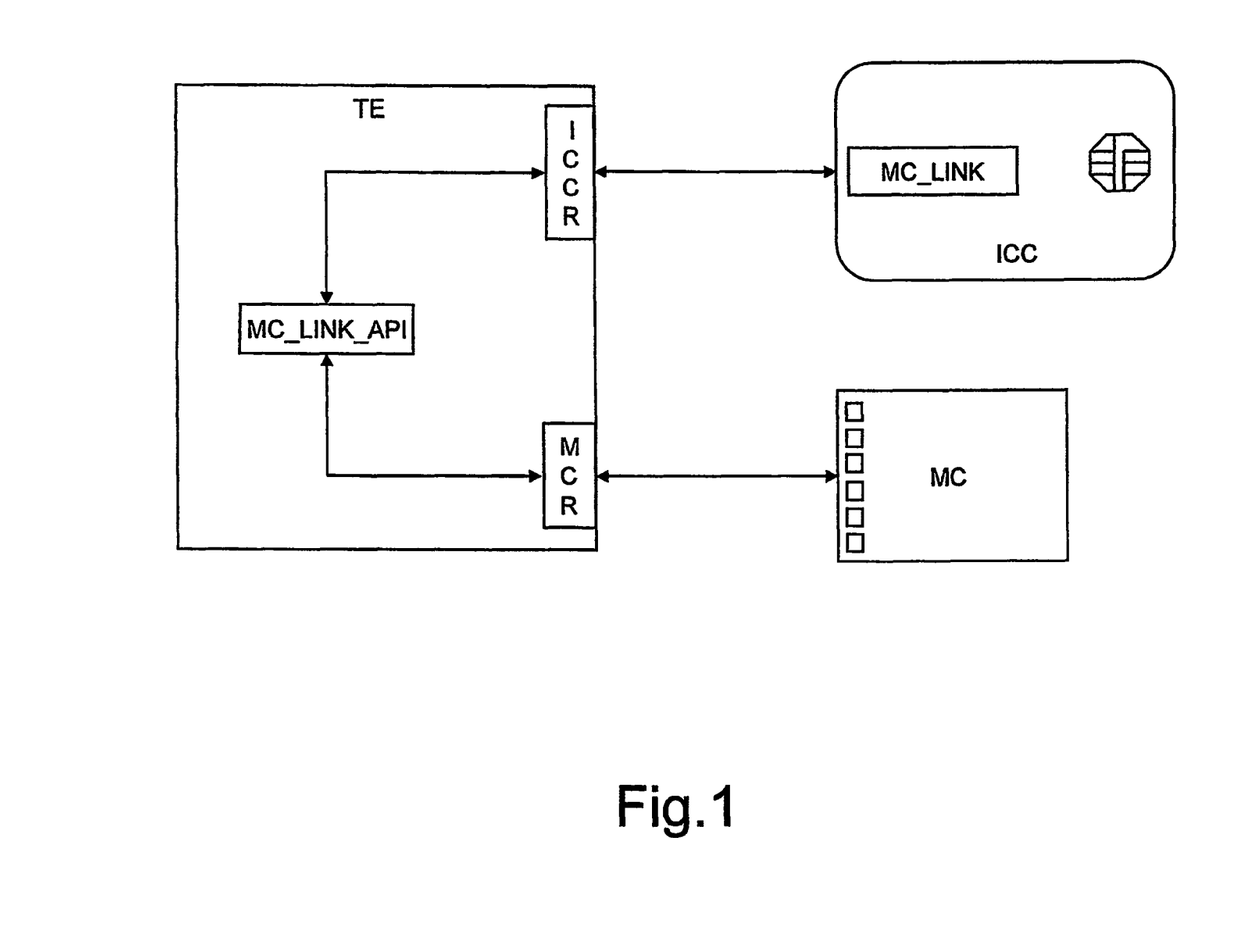
FIG. 1 shows a block diagram of a user system according to an embodiment of the present invention.

FIG. 1 schematically shows a user system including a terminal equipment (TE) provided with an integrated circuit card reader (ICCR) and a memory card reader (MCR), a removable integrated circuit card (ICC), and a removable memory card (MC).

The integrated circuit card exploits a consolidate technology used in many integrated circuit technology (ICT) fields such as telecommunication, banking, identification, e-commerce, etc. They are well standardized in their intersector features (ISO/IEC 7816 standards series) and in their sector based features (for example ETSI and 3GPP standards for telecommunication). Presently, an integrated circuit card is based on a 32-bit central processing unit and can exploit till 8 Kbytes of RAM, 300 Kbytes of ROM and 128 Kbytes of EEPROM. Some integrated circuit cards based on flash memory have also been proposed and can provide till 1 Mbyte of non volatile memory.

The memory card can be found in many formats and technologies. The most common are: compact Flash™ card, smart Media™ card, memory Stick™ card, multimedia card, and secure Digital™ card, the memory size of which can vary from 8 Kbytes to 1 GByte.

The integrated circuit card communicates with the terminal equipment through a standard integrated circuit card interface (ISO/IEC 7816-3 electrical interface and transmission methods for asynchronous communication through T=0 and T=1 protocols; ISO/IEC 7816-10 electrical interface and transmission methods for synchronous cards; ISO/IEC 7816-12 electrical interface and transmission methods for universal serial bus (USB) cards), and uses an application protocol data unit (APDU) (ISO/IEC 7816-4 interindustry commands; ISO/IEC 7816-8 security operation commands; ISO/IEC 7816-9 card management commands) in order to exchange commands with terminal equipment.

The memory card communicates with the terminal equipment through its proprietary protocol which depends on the memory card type (i.e. multimedia card, secure Digital™ card, memory Stick™), and may be of the type either with or without a microprocessor, both available on the market.

The user system further includes a card link application, hereinafter referred to as MC_Link, which is a software module stored in and running on the integrated circuit card and having the aim to set up and manage a secure logical connection between the integrated circuit card and the memory card, and an application programming interface (API), hereinafter referred to as MC_Link_API, which is a software stored in and running on the terminal equipment and having the aim to interpret the MC_Link requests and to adapt and/or forward the data which comes from the integrated circuit card to the memory card interface and vice versa. In particular, in the former case (adaptation and forwarding), the MC_Link sends to the MC_Link_API the instruction for the memory card, and the MC_Link_API codes the instruction in the memory card protocol, whereas in the latter case (only forwarding) the MC_Link sends to the MC_Link_API the command for the memory card, and the MC_Link_API forwards the command without change its coding.

The MC_Link provides the other software applications running on the integrated circuit card with a protocol to interact with the memory card. In particular, the MC_Link provides the other applications with the following functions:

"Read Data": this function is used to read data from the memory card;

"Read Cipher Data": this function is used to read and decipher data from the memory card;

"Write Data": this function is used to write data in the memory card;

"Write Cipher Data": this function is used to cipher and write data in the memory card;

"Erase Data": this function is used to erase data from the memory card; and

"Execute Command": this function is used to perform commands on the memory card.

The algorithm used to cipher and decipher data depends on the implementation of the MC_Link, and for example my be a DES or 3DES algorithm or a proprietary algorithm.

In addition, the MC_Link exchange data and commands with the MC_Link_API in order to reach the memory card on the terminal equipment. In particular, the MC_Link performs the following functions:

"Get Terminal Capabilities": this function is used to provide the integrated circuit, card with information about the terminal equipment capabilities in relation to the memory card. In particular, this function informs the integrated circuit card if:

the terminal equipment has one or more memory card readers;

a memory card is inserted into a memory card reader; and a memory card has been inserted.

In response to the command, the MC_Link_API checks the status of the memory card reader(s) and sends the information to the integrated circuit card.

"Open MC": this function is used to open a logical channel between the integrated circuit card and a memory card and to retrieve the information on the availability of a memory card. This function also provides the terminal equipment with the memory card reader number that the integrated circuit card wants to reach. In response to the command, the MC_Link_API takes the control of the memory card and reserves it for the integrated circuit card needs.

"Close MC": this function is used to close a logical channel between the integrated circuit card and the memory card. In response to the command, the MC_Link_API releases the control of the memory card.

"Get MC Capabilities": this function is used to provide the integrated circuit card with information about the memory card capabilities, and in particular:
the memory card type;
the memory card size;
the memory card available memory;
the memory card identification; and
the memory card security capabilities.

In response to the command, the MC_Link_API checks the memory card capabilities in terms of memory size, file system, security and sends the information to the integrated circuit card;

"Perform MC Command": this function is used to execute commands and receive corresponding responses from the memory card. The commands depend from memory card capabilities and may be the following (others could be added depending on the type of memory card used):

Basic Commands
  RESET
  ASK MC IDENTIFICATION
  SET MC PARAMETER
  SELECT
  SEND STATUS
  INACTIVE MC
Read, Write and Erase Commands
  SET BLOCK LENGTH
  READ BLOCK
  READ MULTIPLE BLOCK
  WRITE BLOCK
  WRITE MULTIPLE BLOCK
  a EREASE
  EREASE BLOCK
Security-related Commands
  LOCK/UNLOCK
  VERIFY PIN
  VERIFY CERTIFICATE
  SET KEY
  SET CERTIFICATE
  SEND KEY
  SEND CERTIFICATE Upon receiving a command, the MC_Link_API interprets and executes it, receives the memory card response relating to the execution of the command and sends it to the integrated circuit card. The MC_Link_API also manages errors reported by memory card and send them to the integrated circuit card.

Figure 2:
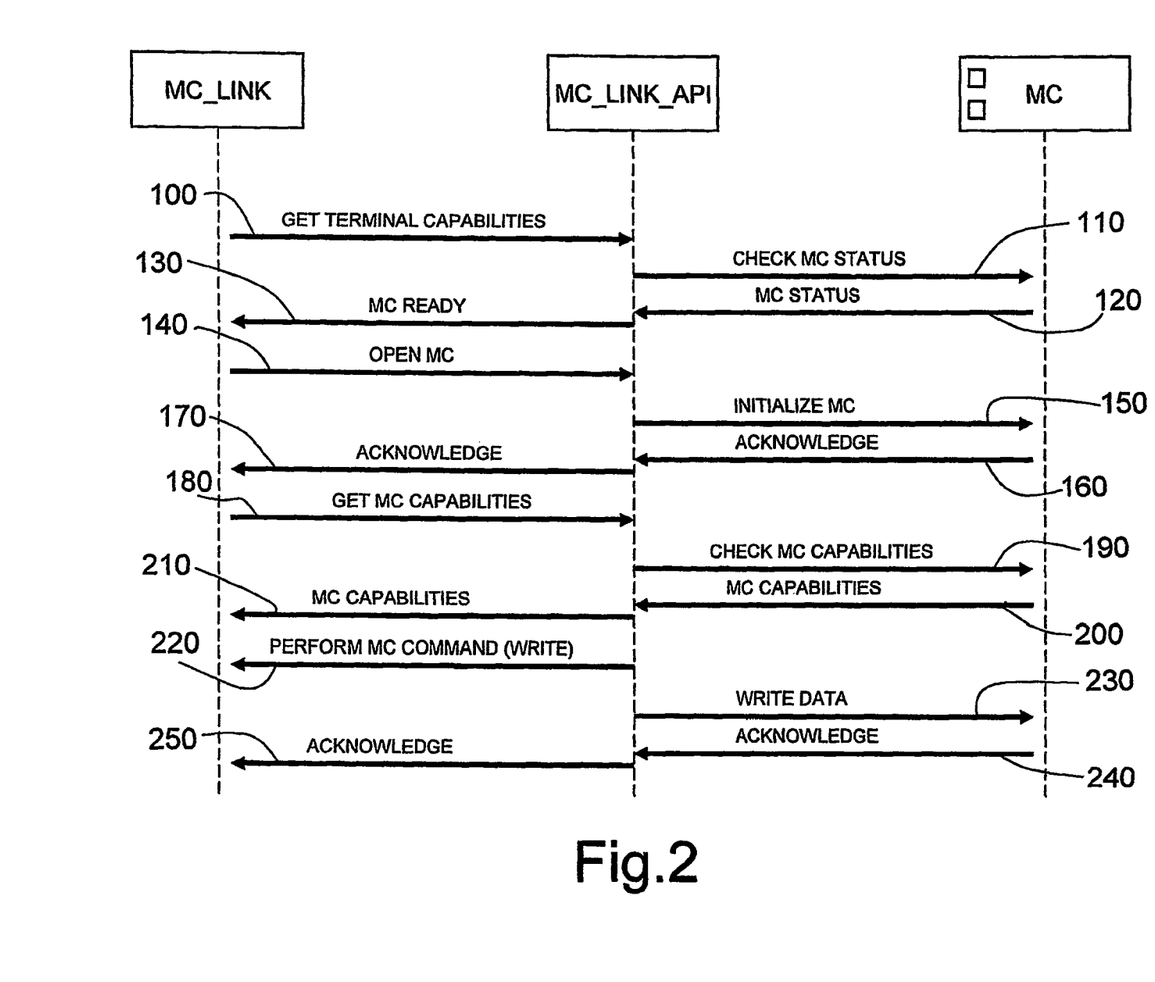
FIG. 2 shows a flowchart of the operations carried out during writing of a memory card.

FIG. 2 shows the commands and responses exchanged between the MC_Link and the MC_Link_API during writing of data in the memory card.

In particular:
the MC_Link sends the command "Get. Terminal Capabilities" to the MC_Link_API (arrow 100), which checks the memory card status (arrows 110 and 120), and sends to the MC_Link the response "MC Ready" (arrow 130);
the MC_Link then sends to the MC_Link_API the command "Open MC" (arrow 140), which initializes the memory card (arrows 150 and 160), and sends to the MC_Link the response "ACK" (arrow 170);
the MC_Link then sends the command "Get MC Capabilities" to the MC_Link_API (arrow 180), which retrieves the memory card capabilities (arrows 190 and 200), and sends the information to the MC_Link (arrow 210);
the MC_Link then sends the command "Write (data)" to the MC_Link_API (arrow 220), which writes the data in the memory card (arrows 230 and 240), and sends to the MC_Link the response "ACK" (arrow 250).

The cases related to the other memory card commands are similar to that previously described, the only difference lying in the memory card command sent by the MC_Link to the MC_Link_API within the "Perform MC Command".

Figure 3:
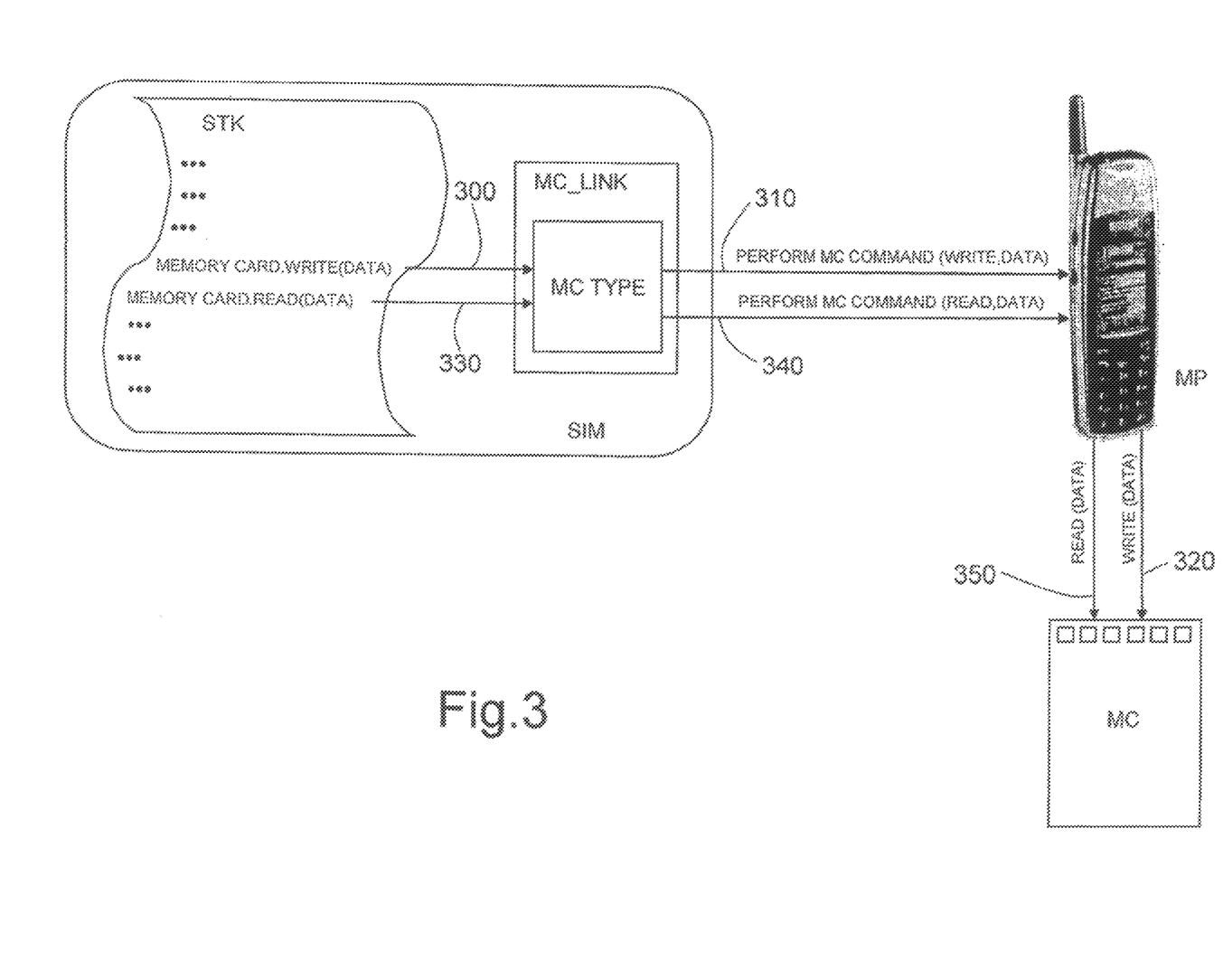
FIG. 3 shows how a SIM toolkit applet may use the present invention.

FIG. 3 shows the application of the present invention in the field of mobile communications, wherein the terminal equipment is a mobile phone, the integrated circuit card is a SIM card, and the memory card is a multimedia card.

In this application, a SIM toolkit applet (STK) uses the functions provided by the MC_Link to write data in and read data from the multimedia card. The MC_Link may for example be developed in java card language and provides the SIM toolkit applet with the class and the methods for writing and reading the memory card. The SIM toolkit applet simply uses this methods without knowing which type of memory card is inserted in the mobile phone. The MC_Link running on the SIM card communicates with the MC_Link_API running on the mobile phone by means of a SIM application toolkit (SAT), which is a set of commands defining how a card interacts with an Handset and extends the communication protocol between the card and the handset. With the SIM application toolkit, the card has a proactive role in the Handset, which means that the SIM card initiates commands independently of the handset and the network. In 2G networks, the SIM application toolkit was defined in 3GPP 51.014 standard.

In particular, in order to write data in the memory card inserted in the mobile phone:
the SIM toolkit applet instructs the MC_Link to write data in the memory card by calling the function "Memorycard.write(data)" (arrow 300);
the MC_Link defines the type of the memory card, codes the command, and sends it to the mobile phone within the SIM application toolkit command "Perform MC Command" (arrow 310); and
the mobile phone interprets the "Perform MC Command", and writes the data in the memory card (arrow 320).

In a similar way, in order to read data from the memory card:
the SIM toolkit applet instructs the MC_Link to read data from the memory card by calling the function "Memorycard.read(data)" (arrow 330);
the MC_Link defines the type of the memory card, codes the command, and sends it to the mobile phone within the SIM application toolkit command "Perform MC Command" (arrow 340); and
the mobile phone interprets the "Perform MC Command", reads the data from the memory card, and sends them to the MC_Link, which forwards them to the SIM toolkit applet (arrow 350).

Figure 4:
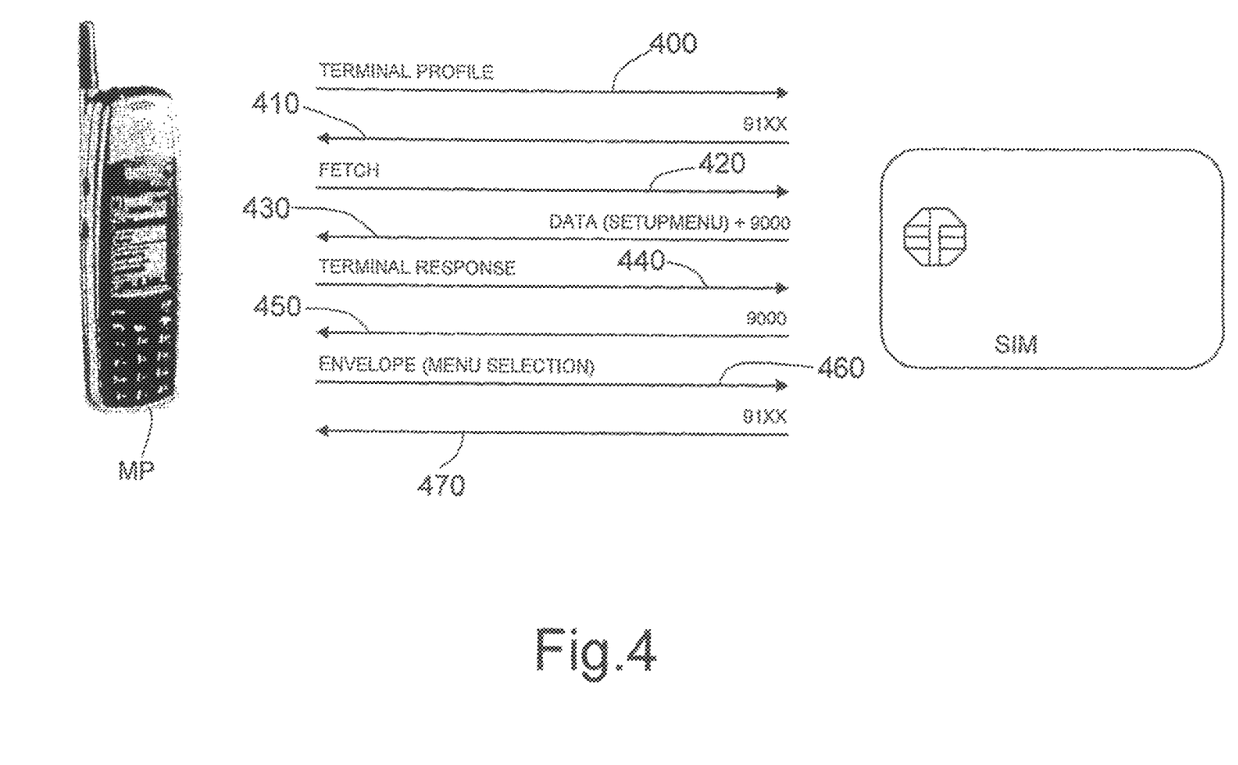
FIG. 4 shows a flowchart of SIM application toolkit commands.

FIG. 4 shows how the SIM application toolkit works.

Initially, the mobile phone sends to the SIM card a command "Terminal Profile" (arrow 400), which contains information for the SIM card about the SIM application toolkit capabilities of the mobile phone. The SIM card can answer with a status word "9000", which means that the command has been executed, or "91XX", which means that the command has been executed and that the SIM card has to send to the mobile phone a proactive command XX long (arrow 410).

When the SIM card sends to the mobile phone a status word "91XX", the mobile phone sends to the SIM card a command "Fetch" to retrieve the proactive command from the SIM card (in the example shown a set up menu) (arrow 420), and the SIM card sends to the mobile phone the set up menu and a status word "9000" (arrow 430).

The mobile phone adds the menu contained in the set up menu to the mobile phone menu and then sends to the SIM card a command "terminal response" to acknowledge the proactive command (arrow 440). The SIM card then responds with a status word "9000" (arrow 450).

Then, the mobile phone sends a command "Envelope" containing the user menu selection which triggers some actions inside the SIM card (arrow 460), and the SIM card sends a status word "91xx" (arrow 470).

The communication between the mobile phone and the SIM card then goes on with the sending of another command "Fetch" from the mobile phone to retrieve another proactive command from the SIM card.

According to the invention, the SIM application toolkit also includes the previously described four new commands, i.e., "Open MC", "Close MC", "Get Terminal Capabilities", and "Get MC Capabilities". To do so, the SIM card is designed to implement the four new commands, and the mobile phone is designed to interpret and execute the four new commands and to send the corresponding terminal responses and a command "Terminal Profile" including information relating to the management of the memory card (memory card reader number and memory card already inserted).

In particular:

"Open MC": with this command the SIM card requests a connection with the memory card inserted in one of the card readers of the mobile phone. The only parameter sent within the proactive command is the memory card reader number. The MC_Link_API on the mobile phone checks if the memory card is available and sets up the connection. Some of the terminal responses may be:
command performed successfully;
wrong memory card reader number;
memory card not available;
generic error.

"Close MC": with this command the SIM card closes the connection with the memory card. No parameters are sent with this command. The MC_Link_API on the mobile phone releases the memory card. Some of the terminal responses may be:
command performed successfully;
generic error.

"Get MC Capabilities": with this command the SIM card asks the mobile phone the memory card capabilities in order to know which are the features supported by it. No parameter are sent with this command. The MC_Link_API gets the memory card information and sends a terminal response which contains the following information:
memory card type (multimedia card, secure Digital™ card, memory Stick™). The memory card type defines also the mandatory command supported;
memory card identification number;
memory size;
memory size available;
optional commands supported by the memory card.
Some of the terminal response may be:
command performed successfully;
generic error.

"Perform MC Command": with this command the SIM card asks the mobile phone to send a command to the memory card. The parameters are:
memory card command identification;
memory card command parameter;
eventually, data to be written on the memory card.

The MC_Link_API interprets the command and performs the corresponding action on the memory card. The terminal response must eventually contain the data read by the SIM card. It's response may be:
read error;
write error;
erase error;
command performed successfully;
generic error.

Figure 5:
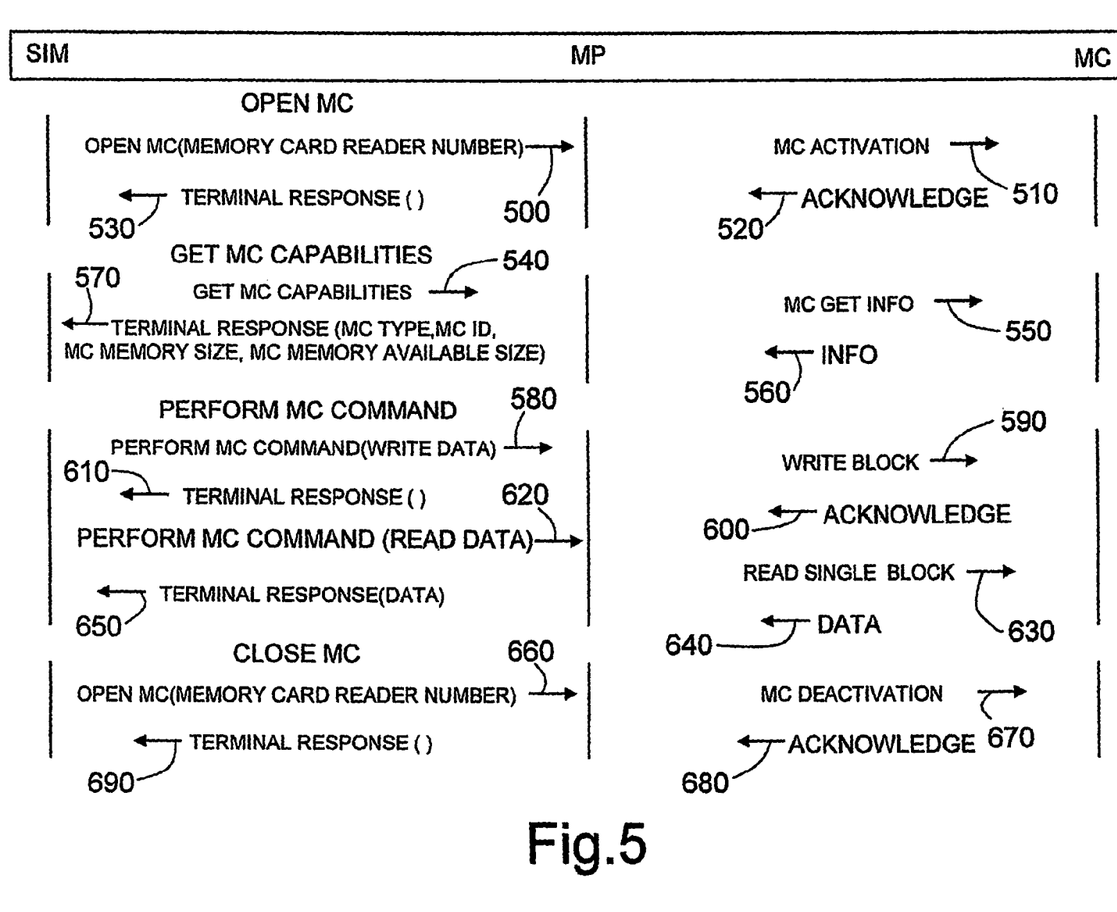
FIG. 5 shows commands exchanged between a SIM card and a memory card through a mobile phone according to the present invention.

FIG. 5 shows the commands and responses exchanged between the SIM card and the memory card through the mobile phone and the actions taken by the mobile phone on the memory card during writing and reading of data on the memory card.

Before the sequence shown in FIG. 5, when the user turns on the mobile phone, during the activation sequence the mobile phone sends to the SIM card the command "Terminal Profile" which contains all the information the MC_Link needs to manage the memory card, namely the number of memory card readers and the number of memory cards inserted.

When the SIM toolkit applet asks the MC_Link to perform an operation on the memory card (read, write or erase), it uses the appropriate function provided by the MC_Link.

Considering the case of writing cipher data on the memory card and of reading them afterwards, the SIM toolkit applet uses the function "Write Cipher Data" to ask the MC_Link to cipher and write data on the memory card.

At this point, the MC_Link starts to set up the link with the memory card. In particular:

the MC_Link sends to the mobile phone the SIM application toolkit command "Open MC" related to one of the memory card readers that the mobile phone had declared in the command "Terminal Profile" (arrow 500);

the mobile phone performs the standard operation to reset and select the memory card (arrows 510 and 520) and, if it is available, it send to the SIM the response "Command Performed Successfully" (arrow 530);

the MC_Link sends to the mobile phone the SIM application toolkit command "Get MC Capabilities" (arrow 540);

the mobile phone gets from the memory card information about memory card type, memory card ID, memory card memory size and security capabilities (arrows 550 and 560), and provides them to the SIM card (arrow 570);

the MC_Link ciphers the data to be written and sends them to the mobile phone within the SIM application toolkit command "Perform MC Command (Write Block, Data)" (arrow 580). Knowing the memory card type, the MC_Link can code the memory card commands within the "Perform MC Command";

the mobile phone sends to the memory card the command "Write Block" along with the ciphered data received from the SIM card (arrow 590). After writing has been completed (arrow 600), the mobile phone acknowledges the operation to the SIM (arrow 610); and the MC_Link informs the SIM toolkit applet that the data has been ciphered and written into the memory card.

Then, the SIM toolkit applet uses the function "Read Cipher Data" to ask the MC_Link to read and decipher data from the memory card. In particular:

the MC_Link sends to the mobile phone the SIM application toolkit command "Perform MC Command (Read Block)" (arrow 620);

the mobile phone reads the data stored in the memory card (arrows 630 and 640) n and sends them to the SIM card (arrow 650);

the MC_Link on the SIM card deciphers data received from mobile phone and sends them to the SIM toolkit applet;

the MC_Link sends to the mobile phone the SIM application toolkit command "Close MC" (arrow 660);

the mobile phone releases the memory card (arrows 670 and 680), and sends an acknowledge to the SIM card (arrow 690).

The present invention may also be applied to scenarios where it is needed to establish a secure logical connection between an integrated circuit card and a memory card removably inserted in different terminal equipments. Practical examples of these scenarios may be a mobile phone with a SIM card which wants to read data from and write data in a memory card in a personal digital assistant (PDA), or a mobile phone with a SIM card which wants to copy pictures from a memory card in a digital photo camera and to send them through multimedia messages (MMS).

Figure 6:
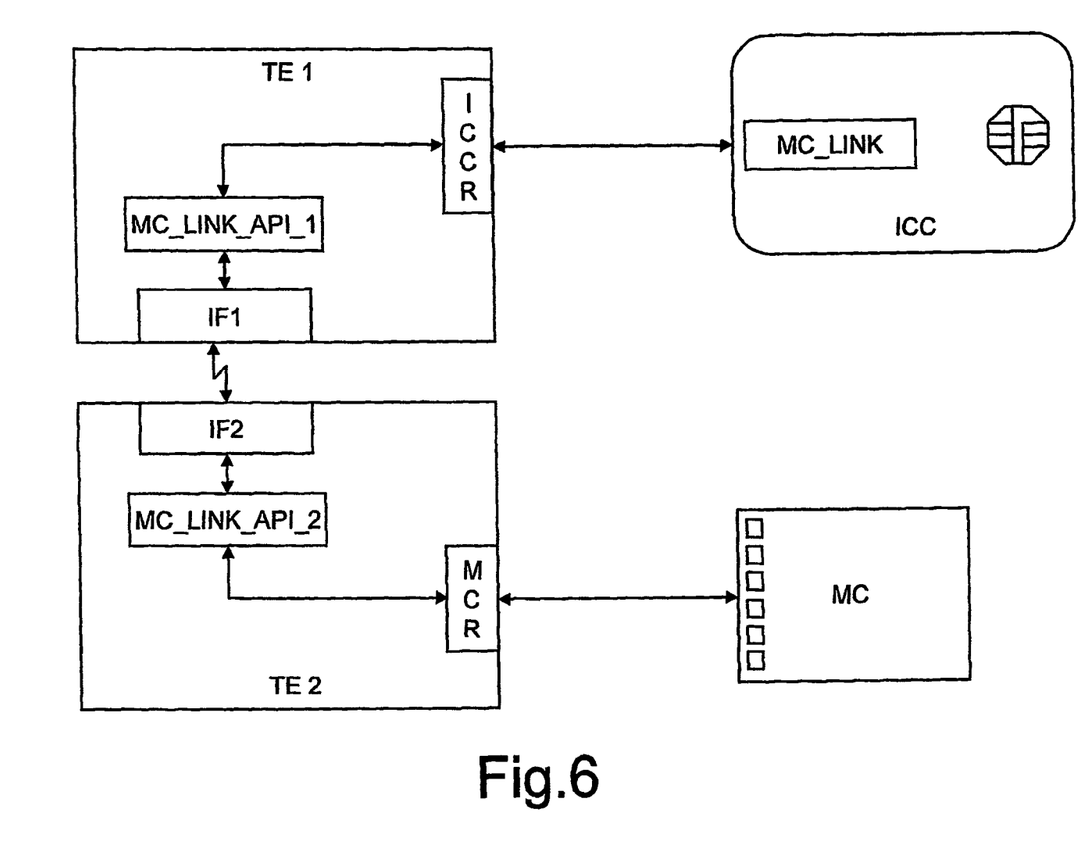
FIG. 6 shows a block diagram of a user system according to a different embodiment of the present invention.

In similar scenarios, schematically shown in FIG. 6, the two TEs, designate by TE1 and TE2, are provided with respective MC_Link_API, designated by MC_Link_API_1 and MC_Link_API_2, which communicates through appropriate wireless or wired interfaces, designated by IF1 and IF2, such as IrDA (Infrared Data Association), Bluetooth, USB, or others. In this case, when the MC_Link_API_1 in the TE1 receives a command from the MC_Link in the integrated circuit card, it reads the memory card reader number in order to find out whether the command is for a memory card in the TE1 or in the TE2. In the former case, the MC_Link_API_1 operates as described above, i.e., interprets and executes the command on the memory card inserted therein, whereas in the latter case, the MC_Link_API_1 sends the command to the MC_Link_API_2 in the TE2, which interprets and executes the command on the memory card inserted therein.

Similarly, the MC_Link_API_2 in the TE2 checks the "terminal response" from the memory card in order to find out whether it is for a SIM card in the TE2 or in the TE1. In the former case, the MC_Link_API_2 in the TE2 operates as described above, i.e., sends the "terminal response" to the integrated circuit card inserted therein, whereas in the latter case the MC_Link_API_2 sends the "terminal response" to the MC_Link_API_1 in the TE1, which sends it to the SIM card inserted therein.

The present invention may also be applied to scenarios where the memory card is the master and the integrated circuit card is the slave, i.e., where the MC_Link runs on the memory card. To do so, the memory card has necessarily to be of the type with a microprocessor. Practical examples of these scenarios may be an application running on the memory card which wants to update some data and needs to be connected with a remote server. In this scenario, the memory card asks the SIM card to set up a connection over the air (OTA) with the remote server in order to retrieve the data, and after the memory card reads the data on the SIM card.

Finally, it is clear that numerous modifications and variants can be made to the present invention, all falling within the scope of the invention, as defined in the appended claims.

The invention claimed is:

1. A user system comprising:
   a first terminal equipment;
   an integrated circuit card configured to cooperate with said first terminal equipment;
   a memory card that communicates with the first terminal equipment through a proprietary protocol that depends on a memory card type;
   a card link application provided in said integrated circuit card to establish and manage a secure logical connection between said integrated circuit card and said memory card through said first terminal equipment; and
   a first application programming interface provided in said first terminal equipment to receive and execute commands from said card link application and to cooperate with said card link application,
   wherein said executing commands by the first application programming interface comprises opening the secure logical connection between said integrated circuit card and said memory card on command from said integrated circuit card, sending responses to said card link application, and coding instructions from said integrated circuit card into the proprietary protocol of the memory card.

2. The user system as claimed in claim 1, wherein said memory card is configured to cooperate with a second terminal equipment connectable to said first terminal equipment and wherein said first application programming interface is configured to send said commands received from said card link application to said second terminal equipment.

3. The user system as claimed in claim 2, further comprising:
   a second application programming interface provided in said second terminal equipment to receive and execute said commands from said first application programming interface.

4. The user system as claimed in claim 3, wherein said second application programming interface is further configured to receive and send responses to said first application programming interface.

5. The user system as claimed in claim 1, wherein said first terminal equipment is a mobile phone and said integrated circuit card is a subscriber identity module card.

6. The user system as claimed in claim 1, wherein said card link application is configured to provide the other applications in said one of said integrated circuit card and said memory card with any of the following functions:
   a function to read data from the other of said integrated circuit card and said memory card;
   a function to read and decipher data from the other of said integrated circuit card and said memory card;
   a function to write data in the other of said integrated circuit card and said memory card;
   a function to cipher and write data in the other of said integrated circuit card and said memory card;
   a function to erase data in the other of said integrated circuit card and said memory card; and
   a function to perform commands on the other of said integrated circuit card and said memory card.

7. The user system as claimed in claim 1, wherein said card link application is configured to implement any of the following functions:
   a function to retrieve information about capabilities of said first or said second terminal equipment in regard to the other of said integrated circuit card and said memory card;
   a function to close said logical channel between said integrated circuit card and said memory card;

a function to retrieve information about the other of said integrated circuit card and said memory card; and a function to execute commands and receive corresponding responses from the other of said integrated circuit card and said memory card.

8. A method for establishing a secure logical connection between an integrated circuit card configured to cooperate with a first terminal equipment and a memory card through said first terminal equipment, comprising:

providing a card link application in one of said integrated circuit card and said memory card to establish and manage a secure logical connection between said integrated circuit card and said memory card through said first terminal equipment, said memory card communicating with said first terminal equipment through a proprietary protocol that depends on a memory card type; and providing a first application programming interface in said first terminal equipment to receive and execute commands from said card link application and to cooperate with said card link application, wherein said executing commands by the first application programming interface comprises opening the secure logical connection between said integrated circuit card and said memory card on command from said integrated circuit card, sending responses to said card link application, and coding instructions from said integrated circuit card into the proprietary protocol of the memory card.

9. The method as claimed in claim 8, for a memory card configured to cooperate with a second terminal equipment connectable to said first terminal equipment, further comprising:

configuring said first application programming interface to send said commands from said card link application to said second terminal equipment.

10. The method as claimed in claim 9, further comprising:
providing a second application programming interface in said second terminal equipment to receive and execute said commands from said first application programming interface.

11. The method as claimed in claim 10, further comprising:
configuring said second application programming interface to receive and send responses to said first application programming interface.

12. The method as claimed in claim 8, wherein said card link application is provided in said integrated circuit card.

13. The method as claimed in claim 8, wherein said first terminal equipment is a mobile phone and said integrated circuit card is a subscriber identity module card.

14. The method as claimed in claim 8, further comprising:
configuring said card link application to provide the other applications in said one of said integrated circuit card and said memory card with any of the following functions:

a function to read data from the other of said integrated circuit card and said memory card;

a function to read and decipher data from the other of said integrated circuit card and said memory card;

a function to write data in the other of said integrated circuit card and said memory card;

a function to cipher and write data in the other of said integrated circuit card and said memory card;

a function to erase data in the other of said integrated circuit card and said memory card; and a function to perform commands on the other of said integrated circuit card and said memory card.

15. The method as claimed in claim 8, further comprising:
configuring said card link application to implement any of the following functions:

a function to retrieve information about capabilities of said first or said second terminal equipment in regard to the other of said integrated circuit card and said memory card;

a function to close said logical channel between said integrated circuit card and said memory card;

a function to retrieve information about the other of said integrated circuit card and said memory card; and a function to execute commands and receive corresponding responses from the other of said integrated circuit card and said memory card.

* * * * *